Patented Oct. 9, 1923.

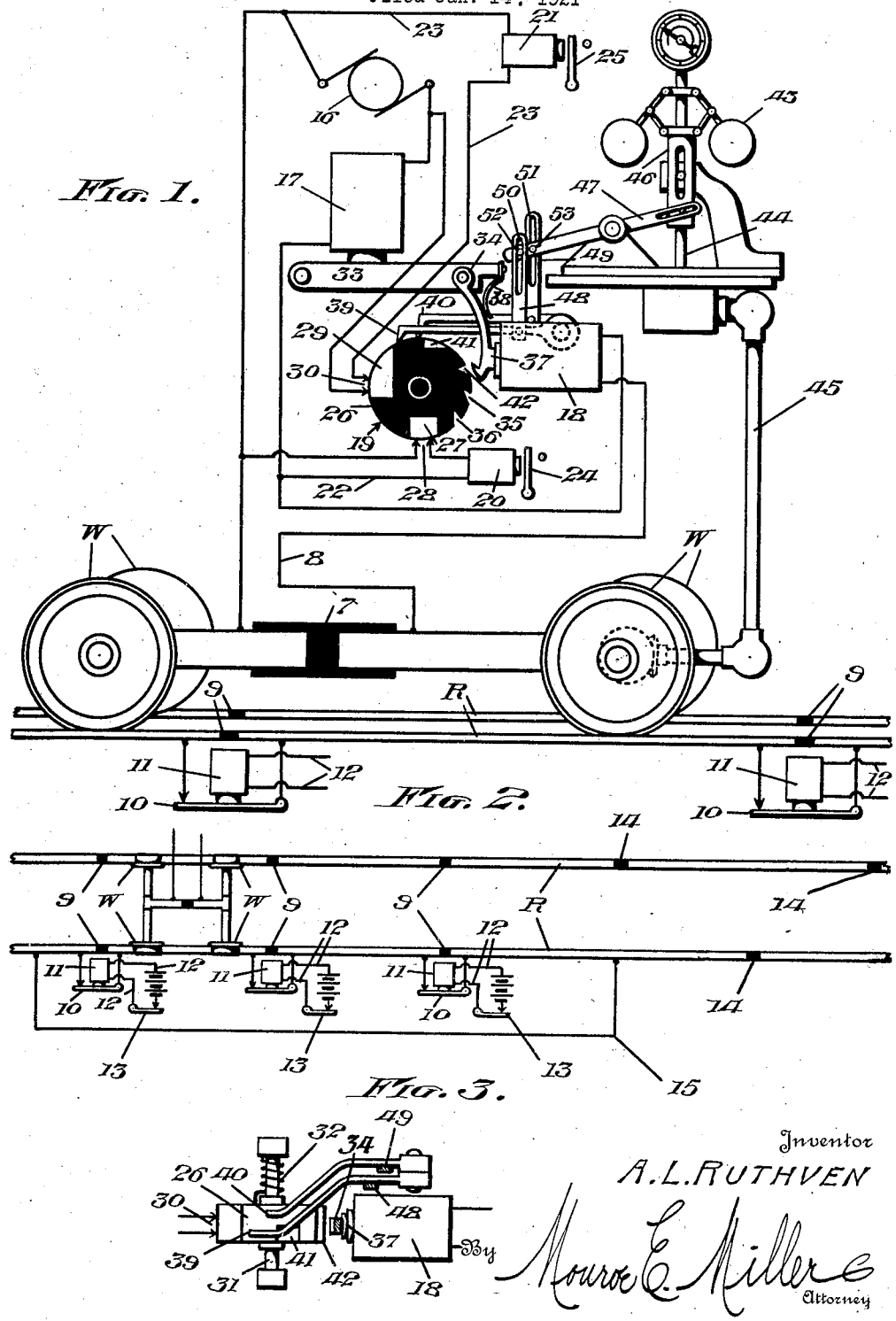

1,470,108

UNITED STATES PATENT OFFICE.

ALFRED L. RUTHVEN, OF ROCHESTER, NEW YORK, ASSIGNOR TO SIMPLEX TRAIN CONTROL COMPANY, INC., OF ROCHESTER, NEW YORK, A CORPORATION OF NEW YORK.

SIMPLEX TRAIN CONTROL.

Application filed January 14, 1921. Serial No. 437,288.

*To all whom it may concern:*

Be it known that I, ALFRED L. RUTHVEN, a citizen of the United States, residing at Rochester, in the county of Monroe and State of New York, have invented certain new and useful Improvements in Simplex Train Controls, of which the following is a specification, reference being had therein to the accompanying drawing.

The present invention relates to train controlling apparatus, and has for its primary object the provision of an extremely simple, highly efficient and thoroughly reliable apparatus of that nature for the control of a vehicle or train, which eliminates complicated track and vehicle circuits and equipment, and which utilizes a primarily simple cooperative relation between the vehicle and track to obtain various conditions of vehicle control as may be desired.

Another object is the utilization of insulation in the rails in such a way and in such an arrangement that the vehicle circuit of the electrical equipment is controlled for producing such vehicle-controlling conditions as predetermined, without the necessity of using complicated cooperating devices between the vehicle and track, such as ramps, trips, induction magnets, and similar obstructions on the vehicle or track, so as to reduce the cooperating devices between the vehicle and track to a primarily simple construction, which will nevertheless be thoroughly efficient, practical and dependable.

A further object is the provision of a vehicle equipment for controlling one or more devices, for indicating or signalling caution and danger conditions, or for controlling the train for such conditions, or the like, as may be desired according to any previously-selected arrangement, and controlled by the simple closing and opening of the vehicle circuit, the arrangement being such that danger indications or conditions will be produced should the electrical current for either the track or vehicle equipment fail, thus providing for a reliable and certain stopping of the vehicle should the equipment fail to functon as intended, as well as providing for the efficient and unerring control of the vehicle according to track conditions, in order that the vehicle will be stopped or given a danger signal or condition should the apparatus become defective or should the vehicle equipment fail to respond to the track conditions as intended.

A still further object is the provision of a vehicle equipment having novel means to be operated step by step or with progressive action to produce different desired signals or conditions in succession as the vehicle moves along the track, and thus enable various conditions to be indicated on the vehicle or the vehicle controlled accordingly. In this manner, as the vehicle proceeds which may be in either direction if the apparatus is so intended, a caution signal or condition can be produced on the vehicle, and, if desired a danger signal or condition can then be produced after such caution indication or condition, or a series of successive signals or conditions can be provided for to operate step by step or in progressive succession in order to develop a proper caution and then danger condition or control of the vehicle.

A further object is the control of such vehicle equipment according to the speed of the vehicle under caution and danger conditions, whereby normal conditions can only be restored for the continued movement of the vehicle when the predetermined conditions are complied with, such as after the slowing down of the vehicle below a predetermined speed following a caution signal or condition, or the bringing of the vehicle to a stop after a danger indication or condition, whereby requiring either the retarding or slowing up of the vehicle under caution conditions to enable the vehicle to proceed or the stopping of the vehicle under danger conditions before it can resume its movement.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a diagrammatical view of the apparatus.

Figure 2 is a diagrammatical view of the track part of the apparatus, showing the insulation for the rails and simple track circuits.

Fig. 3 is a plan view of the ratchet device of the vehicle equipment.

The track part of the apparatus employs the traffic rails R, although special control rails or conducting means can be used if desired, but such special rails are unnecessary inasmuch as the traffic rails will suffice in most instances. As shown two pairs of wheels W travel on said rails R. These wheels may be the wheels of one of the trucks of the locomotive or one of the cars, or may be a special truck, it being required that the two pairs of wheels W be insulated from one another, as at 7, and the terminals of a vehicle control circuit 8 are connected to the two pairs of wheels W so that said circuit will be normally closed whenever either of both of the rails R are electrically continuous between the wheels W at the corresponding side or sides.

The circuit 8 is opened or broken by the provision of insulating points 9 in both rails R arranged in pairs whereby the truck in passing over a control point will bring the wheels W at opposite sides of or astride the insulating points 9 of one pair, thereby breaking or opening the circuit 8 through both rails R between the wheels W at the opposite sides. Any suitable number of pairs of insulating points 9 in the rails R can be provided in series or at suitably-spaced intervals at a control station or portion of the track, whereby the vehicle in moving along the track and passing over the insulating points 9 in succession, will break the circuit 8 one or more times, according to the conditions. The pairs of insulating points 9 are spaced apart farther than the wheels W, whereby the circuit 8 is closed when the truck is travelling between two pairs of insulating points 9, whereas the circuit is opened or broken when the truck passes over either pair of insulating points, thus successively breaking and closing the circuit, unless one rail R is electrically connected or bridged across the insulating point or points 9.

In order to control the vehicle equipment from the track, under traffic or other conditions, one insulating point 9 of each pair is bridged by a suitable switch 10, which when closed will connect the sections of the corresponding rail R across the insulation, to make the rail electrically continuous so that the wheels W at one side are in electrical connection, even though the truck is astride the insulating points 9, and maintaining the circuit 8 closed, unless the switch 10 is opened, which will break the circuit. The opening and closing of the switch 10, therefore, will result in the circuit 8 being either opened or maintained closed when the truck passes over the insulating points 9 of the rails. The switches 10 of the several insulated points of the track can be operated by any suitable means. As shown, electromagnets 11 are employed for holding the switches 10 closed, whereby such switches will open automatically if the electromagnets are deenergized, either intentionally or by the accidental failure of the track equipment, thereby providing a positive breaking or opening of the circuit 8 when the truck passes over the insulating points 9. As shown, each magnet 11 is disposed in a circuit 12 including a controlling switch 13 that can be operated manually or by any suitable mechanism or means for control as may be desired or necessary.

When it is desired to use the present arrangement in combination with an ordinary block signal system, the rails R can be insulated at other points, as at 14, for such purposes, provided that such insulating points 14 are staggered and sufficiently spaced apart so that two insulating points 14 of the two rails do not lie sufficiently close together so that the truck could pass astride such insulating points simultaneously. This will permit of the insulation of both rails at intervals as at 14 for block signals or the like, without in any way interfering with the operation of the present apparatus. The insulating points 9, however, must be arranged sufficiently far apart longitudinally of the track so that the space between them be greater than the space between the pairs of wheels W. Furthermore, if it is desired that one or both rails be used as a part of a signal circuit, a conductor 15 bridging the sets of insulating points 9, can have its terminals connected to either rail R whereby electrical current can flow through the conductor 15 past the insulating points 9, without in any way interfering with the operation of the apparatus and without the insulations 9 interfering with the circuit of which the conductor and rail may form a part. The only requirement, therefore, for the purposes of the present invention, is that both rails have the insulating points 9 in pairs with switches for bridging the gaps under suitable means of control.

Instead of using the two pairs of wheels of the truck for the contact between the terminals of the circuit 8 and the rails R, any other suitable insulated pairs of contact members can be used, as will be readily understood by those versed in the art.

Coming to the vehicle equipment of which the circuit 8 and pairs of contact wheels or members W are a part, such circuit is energized by an electrical generator 16 or other source of electrical current, thereby energizing, when the circuit is closed, the electromagnets 17 and 18 of a responsive ratchet device 19 for producing different controlling signals or conditions in the vehicle. The device 19 is operable for producing caution and danger signals or conditions, and such other signals or conditions as may be desired, and, as shown, said device controls a caution electromagnet or device 20 and a danger electromagnet or device 21. The magnets 20 and 21 are disposed in the respective circuits 22 and 23, both of which include the generator 16, so that each magnet is energized when its circuit is closed. These magnets 20 and 21 can operate suitable signal members or controlling devices, such as disclosed in my pending applications Serial Nos. 215,300 and 257,336, filed Feb. 4, 1918, and Oct. 8, 1918, respectively, although any suitable signalling or controlling devices can be controlled by the device 19, within the scope of appended claims, by the making and breaking of the electrical circuits or the equivalent thereof. For purpose of illustration, pivoted armatures 24 and 25 for the magnets 20 and 21 are provided, which are normally attracted to said magnets, when they are energized, and when the magnets are deenergized said armatures will swing or drop to give caution and danger signals or to produce corresponding conditions, respectively.

The ratchet device 19 is responsive to track conditions for controlling the vehicle equipment accordingly, and includes a ratchet wheel or drum 26 having a segment 27 normally bridging the terminal contact 28 of the circuit 22, and said wheel 26 has a second segment 29 normally bridging the terminal contacts 30 of the circuit 23. The segment 29 is longer, circumferentially of the wheel, than the segment 27, whereby when the wheel 26 is advanced one step, the segment 27 is removed from the contacts 28, thereby opening the circuit 22, whereas the segment 29 still bridges the contacts 30, but when the wheel is advanced another step, then the segment 29 is also removed from the contacts 30, thereby opening the circuit 23. In this manner, the signalling or controlling devices are operated in succession for producing a caution signal or condition first and then a danger signal or condition, or a series of other signals or conditions can thus be obtained in progressive succession, as the device 19 is advanced or moved step by step. The ratchet wheel 26 is mounted for rotation on a shaft 31, and a suitable spring 32 or other means serves to return the wheel 26 to original or initial position when the wheel is released, to automatically restore the caution and danger signalling or controlling devices by closing the circuits 22 and 23.

The responsive electromagnet 17 in the main vehicle circuit 8 serves the purpose of advancing the wheel 26 step by step as the circuit 8 is opened and closed in succession. Thus, an armature lever 33 is attracted by said magnet 17 when it is energized, and carries a pivoted pawl 34, and the wheel 26, has the notches or teeth 35 and 36 for the successive engagement of said pawl, and the pawl carries an armature 37 under the influence of the electromagnet 18, which magnet 18 serves to release the pawl 34 from the ratchet wheel 26 when the wheel has been advanced a step. A spring 38 is provided for swinging the pawl against the wheel 26 when said pawl is released from the magnet 18. Normally, the armature lever 33 is attracted by the magnet 17 and the pawl 34 attracted by the magnet 18, when the circuit 8 is normally closed, and when the circuit is broken either intentionally or accidentally, or should the current fail, the magnets 17 and 18 are deenergized, thereby releasing the lever 33 and its pawl 34. Such lever will drop and the pawl engage the notch or tooth 35, and when the circuit 8 is again closed, the lever 33 is attracted by the energized magnet 17 thereby turning the wheel 26 one step, and when the step is completed, the pawl in moving with the lever 33 will bring the armature 37 thereof in close proximity with the pole of the magnet 18, so that the pawl is attracted to the magnet 18 and disengaged from the wheel 26, thereby providing for the advance of the wheel 26 and the releasing of the pawl 34 with one operation.

Means is provided for holding the wheel 26 when advanced one or more steps, so as to maintain the signalling or controlling conditions dependent on other conditions, and, for this purpose, a pair of catches or detents 39 and 40 are pivotally mounted to bear against the periphery of the wheel 26, and said wheel has a notch or tooth 41 for the engagement of the catch 39 when said wheel is advanced one step as above described. The wheel has a second notch or tooth 42 for the engagement of the catch 40 when the wheel is advanced a second step, should the circuit 8 be broken or opened the second time, resulting in the repetition of the operation of the lever 33 and its pawl 34, during which the pawl 34 will engage the second notch or tooth 36 to advance the wheel 26 the second step.

The restoration of normal conditions is controlled by the speed or motion of the vehicle, thereby requiring certain conditions as to the movement of the vehicle to be complied with before normal conditions are restored. For this purpose, a governor 43 is provided, being operated according to the speed of the vehicle, said governor being mounted on a shaft 44 which is operatively connected, by any suitable means, as at 45, with one of the wheels of the vehicle, and said governor has a sleeve 46 slidable on the shaft 44 and moved to different position according to the speed of the governor. A lever 47 is operated by the sleeve 46 in order to position said lever according to the speed of the vehicle, and this lever is operatively connected with the catches 39 and 40 by bars 48 and 49, respectively, which have the respective slots 50 and 51 receiving the lugs 52 and 53 of the lever 47. Said slots permit the catches 39 and 40 to drop or swing into the respective notches 41 and 42, and the slots are of such a length, that when the speed of the vehicle is reduced below a predetermined rate of speed for caution conditions, the lever 47 in being swung will result in the lug 52 contacting with the upper end of the slot 50, thereby raising the catch 39 and disengaging it from the wheel 26, whereas if the speed of the vehicle is reduced still further and the vehicle brought to a stop, the lever 47 is swung farther so that when the vehicle comes to rest, the lug 53 in contacting with the upper end of the slot 51 of the bar 49, will now raise the catch 40 and disengage it from the wheel 26. In this manner, the detent devices or catches 39 and 40, which maintain the device 19 in advanced signalling or controlling positions, are controlled by the governor 43 according to the movement of the vehicle, said catches 39 and 40 being released in succession as the vehicle speed is reduced below a predetermined safe caution speed and to a standstill, respectively.

In operation, the circuit 8 is normally closed by one or both rails R when the vehicle is moving on the track, providing the switches 10 are in closed or clear position, so that the vehicle equipment is normally energized with the armatures or members 24 and 25 in clear position. Now, should the truck pass over a pair of insulating points 9, the switch 10 of which is opened, this will result in the insulating points 9 stopping the flow of current between the wheels W at both sides thereby opening or breaking the circuit 8, and the magnets 17 and 18 are therefore deenergized. When the truck has passed such insulating points 9, the circuit 8 is again closed by the rails R, thereby again energizing the magnets 17 and 18, and operating the lever 33 so as to advance the wheel 26 one step and to then release the pawl 34, said wheel being held in this position by the engagement of the catch 39 in the notch 41. As a result, circuit 22 is opened by the removal of the segment 27 from the contact 28 thereby deenergizing the magnet 20 and releasing the armature or member 24 which will give a caution signal, or produce caution conditions otherwise for controlling the vehicle. Such conditions will continue as long as the wheel 26 is retained in advanced position by the catch 39, until the speed of the vehicle is reduced below a safe caution speed, at which time, the movement of the governor 40 will swing the lever 47 a sufficient amount to pull the bar 48 and swing the catch 39 away from the wheel 26, thereby releasing said wheel so that the spring 32 will turn said wheel to normal position and again close the circuit 22. Supposing that after the device 19 is actuated for caution conditions, the truck passes over a second pair of insulating points 9, the switch 10 of which is opened, this will again open the circuit 8 for an interval until the truck has passed the insulating points, in which event the circuit 8 will again close. Consequently, the lever 33 being dropped and then raised by the magnet 17, will result in the pawl 34 being removed from said wheel by the magnet 18 as before. This will, in addition to the opening of the circuit 22, also open the circuit 23 by the removal of the segment 29 from the contacts 30, so that the magnet 21 will be deenergized to release the armature or member 25 for indicating danger or producing danger conditions, which are maintained as long as the wheel 26 is held by the catch 40. When the vehicle is brought to a stop, the governor 43 in coming to a standstill, will swing the lever 47 sufficiently to pull the bar 49 and disengage the catch 40 as will the catch 39 from the wheel 26, thereby releasing said wheel for the return thereof to initial position under the influence of the spring 32. This will restore normal conditions for the movement of the vehicle.

The insulating points 9 can be repeated at intervals along the track, so as to repeat the control of the vehicle so that if the vehicle proceeds under caution or danger conditions the opening of the circuit 8 can be repeated to repeat the caution and danger control. Furthermore, the control is positive, because the circuit 9 will be broken whenever the truck passes over a pair of insulating points 9 with the switch 10 open and the switch 10 will open either by the intentional opening of the circuit 12 or the failure of current in said circuit. Consequently, when there is danger or caution conditions of the track, or failure of track current, the vehicle equipment will be controlled for such conditions, and it requires the energized condition of the track equipment to enable the vehicle to continue its movement for clear conditions. Furthermore, if the current in circuit 8 fails this will immediately deenergize the magnets 20 and 21 to produce caution and danger conditions, preventing further progress of the vehicle.

Various arrangements of the insulating points 9 of the rails R can be used, and at each controlling portion or station of the track there can be as many pairs of insulating points 9 as may be required. For example, as seen in Fig. 2, there are three pairs of insulating points 9, and the intermediate pair can be used for caution and the other pairs for danger, whereby during the movement of the vehicle in either direction it can be given a caution signal or condition, and at least two progressive operations or movements to produce a danger signal or condition. Thus, when the switch 10 of the intermediate pair of insulating points 9 is open and the others closed, this will produce a caution indication or condition, whereas if, in addition to the intermediate switch 10 being open, one or both of the other switches 10 are opened, this will repeat the breaking of the circuit 8, to produce a danger indication or condition. A series of such insulating points can also be used to assure of the repeated operation of the device 19 to obtain a danger signal or condition without fail.

The double closure of the circuit 8 by the rails R is of further advantage, in addition to permitting of the staggered insulation of the rails, as at 14, because the circuit 8 is kept closed by either rail, should the other rail fail to close the circuit for any reason whatever, such as insulating matter accumulated on the rail, or the like, thus giving ample assurance against the accidental opening of the circuit when the vehicle is between the insulating points 9. Also, the vehicle can enter a section of track or another right of way not using the track arrangement, and vehicles or trains not equipped with the apparatus, as well as snow plows, can enter protected portions of the roadway without any interference or disadvantage.

Having thus described the invention, what is claimed as new is:—

1. Vehicle controlling apparatus including a conductor along which a vehicle is movable, having insulating points therein, means for bridging said insulating points, and a vehicle controlling device including a circuit normally closed by said conductor and opened by said insulating points, when the bridging means are open, said device being operable by the reclosing of said circuit after being opened when passing one of said insulating points with its bridging means open, to thereby complete a predetermined condition of vehicle control which is maintained after passing such insulating points until the corresponding required conditions are complied with.

2. A vehicle controlling apparatus including a conductor along which a vehicle is movable, having insulating points therein, means for bridging said insulating points, and a vehicle controlling device including a circuit normally closed by said conductor and opened by said insulating points when the bridging means are open, said device being operable by the opening and closing of said circuit one or more times, when passing one or more of said insulating points with the corresponding bridging means open, to thereby produce different predetermined conditions of vehicle control accordingly.

3. Vehicle controlling apparatus including a conductor along which a vehicle is movable, having insulating points therein, means for bridging said insulating points, and a vehicle controlling device including a circuit normally closed by said conductor and opened by said insulating points when the bridging means are opened, said device being operable by the opening and closing of said circuit, when passing one of said insulating points with its bridging means open, to thereby produce a caution condition and operable by a repeated opening and closing of said circuit when passing another insulating point with its bridging means open, to thereby produce a danger condition.

4. Vehicle controlling apparatus including a conductor along which a vehicle is movable, having insulating points therein, means for bridging said insulating points, and a vehicle controlling device including a circuit normally closed by said conductor and opened by said insulating points when the bridging means are open, said device being operable by the opening and closing of said circuit when passing one of said insulating points with its bridging means open, to thereby produce a predetermined condition of vehicle control and said device including speed controlled means for maintaining such condition until the vehicle speed is retarded accordingly.

5. Vehicle controlling apparatus including a conductor along which a vehicle is movable, having insulating points therein, means for bridging said insulating points, and a vehicle controlling device including a circuit normally closed by said conductor and opened by said insulating points when the bridging means are open, said device being operable by the opening and closing of said circuit one or more times, when passing one or more of said insulating points with the corresponding bridging means open, to produce progressive conditions of vehicle control, said device including speed controlled means for maintaining such conditions until predetermined reductions in speed of the vehicle has been made accordingly.

6. Vehicle controlling apparatus including a conductor along which a vehicle is movable, having insulating points therein, means for bridging said insulating points, and a vehicle controlling device including a circuit normally closed by said conductor and opened by said insulating points when the bridging means are open, said device being operable by the the opening and closing of said circuit once or twice, when passing one or more of said insulating points, with the corresponding bridging means open, to thereby produce caution and danger conditions accordingly, said device including means controlled by the speed of the vehicle for maintaining such conditions until the vehicle is brought to a predetermined reduced speed or to a stop, respectively.

7. Vehicle controlling apparatus comprising a conductor along which a vehicle is movable, having insulating points therein, means for bridging said insulating points, a progressively operable device on the vehicle, electrical means for operating said device one or more times to bring it to different positions and including a circuit normally closed by said conductor and opened and closed one or more times in passing said insulating points with the corresponding bridging means open, to operate said device accordingly, means controlled by speed of the vehicle and controlling the return of said device under predetermined reductions in speed of the vehicle, and controlling means for the vehicle controlled by said device in its different positions.

8. Vehicle controlling apparatus comprising a conductor along which a vehicle is movable, having insulating points therein, means for bridging said insulating points, an electrically controlled device having a normal position and including a circuit normally closed by said conductor and opened and closed in passing one or more of said insulating points with the corresponding bridging means open to set said device to different controlling positions accordingly, means controlled by the speed of the vehicle and controlling said device for the return thereof to normal position when the vehicle speed has been retarded a predetermined amount, and vehicle controlling means controlled by said device in its different controlling positions.

9. Vehicle controlling apparatus comprising a conductor along which a vehicle is movable, having insulating points therein, means for bridging said insulating points, a step by step device having a normal position, electrical means for operating said device one or more times and including an electrical circuit normally closed by said conductor and opened and closed one or more times in passing said insulating points with one or more of said bridging means thereof open to advance said device to different controlling positions accordingly, governor controlled means controlling said device for the return thereof to normal position when predetermined reductions in speed of the vehicle has been made according to the position of said device, and vehicle controlling means controlled by said device in its different controlling positions.

10. Vehicle controlling apparatus comprising a conductor along which a vehicle is movable, having a set of insulating points therein, means operable for individually and selectively bridging said insulating points, vehicle controlling means including a vehicle circuit normally closed by said conductor and opened and closed one or more times in passing said insulating points with the corresponding bridging means open to obtain different vehicle controlling conditions according to the number of times the circuit is opened, and a conductor connected to the aforesaid conductor and bridging the entire set of insulating points, to enable the portions of the first named conductor beyond the second named conductor to be used in a circuit without interruption by said insulating points.

11. Vehicle controlling apparatus including a conductor along which a vehicle is movable, having insulating points therein, means for bridging said insulating points, a vehicle circuit normally closed by said conductor and opened by said insulating points, when the bridging means are open, a device operated by the opening and closing of said circuit to establish a predetermined condition of vehicle control, and arranged to return to normal position, and means under the control of the speed of the vehicle for retaining said device in operated position until corresponding reduction in vehicle speed is effected.

12. Vehicle controlling apparatus including a conductor along which a vehicle is movable, having insulating points therein, means for bridging said insulating points, a vehicle circuit normally closed by said conductor and opened by said insulating points, when the bridging means are open, a responsive vehicle device operated by the opening and closing of said circuit to obtain predetermined vehicle controlling conditions, and adapted to return to normal position, and means controlled by the speed of the vehicle for controlling said device and including a catch for retaining said device in operated position until the corresponding reduction of vehicle speed has been complied with.

13. Vehicle controlling apparatus including a conductor along which a vehicle is movable and having insulating points therein, means for bridging said insulating points, a vehicle circuit normally closed by said conductor and opened by said insulating points, when the bridging means are open, a responsive vehicle device operated by the opening and closing of said circuit to set said device for predetermined vehicle controlling conditions, and adapted to return to normal position, a catch for retaining said device in operated position, and means controlled by the speed of the vehicle and controlling said catch for releasing said device when the corresponding conditions of vehicle speed have been complied with, so that said device is restored to normal position.

14. Vehicle controlling apparatus in cluding a conductor along which a vehicle is movable, having insulating points therein, means for bridging said insulating points, a vehicle circuit normally closed by said conductor and opened by said insulating points, when the bridging means are open, a responsive vehicle device operated by the opening and closing of said circuit and including a member advanced by the operation of said device and adapted to return to normal position when released, a catch for retaining said member when advanced, vehicle controlling means controlled by said member, and means controlling said catch for releasing said member when the corresponding conditions of vehicle control have been complied with.

15. Vehicle controlling apparatus including a conductor along which a vehicle is movable, having insulating points therein, means for bridging said insulating points, a vehicle circuit normally closed by said conductor and opened by said insulating points, when the bridging means are open, a responsive vehicle device operated by the opening and closing of said circuit and including a member advanced by the operation of said device and adapted to return to normal position when released, a catch for retaining said member when advanced, vehicle controlling means controlled by said member, and means controlled by the speed of the vehicle and controlling said catch to release said member when the speed of the vehicle has been altered according to the required conditions.

16. Vehicle controlling apparatus including a responsive vehicle device operable step by step to different positions and adapted to return to normal position, means controlled by said device in its different positions for obtaining corresponding conditions of vehicle control, and means for retaining said device when operated one or more steps and controlled according to corresponding reductions in vehicle speed to release said device for return movement to normal position.

17. Vehicle controlling apparatus including a responsive vehicle device operable step by step to different positions, means controlled by said device in its different positions when operated one or more steps for obtaining different conditions of vehicle control, and means for retaining said device in position when operated one or more steps and controlled by the speed of the vehicle for maintaining the vehicle controlling conditions until predetermined reductions in vehicle speed have been effected said device returning to normal position when the corresponding speed reductions are made.

18. Vehicle controlling apparatus including a responsive vehicle device operable step by step to obtain different vehicle controlling conditions, and adapted to return to normal position when released, catches for retaining said device when operated one or more steps to corresponding positions, and means controlled for different reductions in vehicle speed and controlling said catches in succession according to the position of said device, for releasing said device for return movement.

19. Vehicle controlling apparatus including a responsive vehicle device operable step by step to different positions for producing corresponding conditions of vehicle control in succession, catches for retaining said device when operated one or more steps, said device being adapted to return to normal position when released, and means controlled by the speed of the vehicle and controlling said catches for releasing said device when corresponding reductions in vehicle speed have been complied with.

20. Vehicle controlling apparatus including a conductor along which a vehicle is movable, having insulating points therein, means for bridging said insulating points, a vehicle circuit normally closed by said conductor and opened by said insulating points, when the bridging means are open, a responsive vehicle device operated step by step to different positions by the opening and closing of said circuit one or more times, and means for retaining said device in its different responded positions until the corresponding vehicle controlling conditions have been complied with, said device returning to normal position when said conditions have been complied with.

21. Vehicle controlling apparatus including a conductor along which a vehicle is movable, having insulating points therein, means for bridging said insulating points, a vehicle circuit normally closed by said conductor and opened by said insulating points, when the bridging means are open, a responsive vehicle device operable step by step to different positions by the opening of said circuit one or more times, means controlled by said device when operated one or more steps for obtaining different conditions of vehicle speed control, said device being adapted to return to normal position, and means for retaining said device in its different responded positions and controlled by the speed of the vehicle for preventing the return of said device until predetermined reductions in speed of the vehicle have been complied with, according to the position of said device.

22. Vehicle controlling apparatus including a responsive vehicle device operable step by step to produce caution and danger conditions in succession, a catch for holding said device in caution position, a second catch for holding said device in danger position, and means controlled by the motion of the vehicle and controlling said catches to release the caution catch upon a predetermined reduction in speed of the vehicle and for releasing the danger catch when the vehicle is brought to a stop.

23. Vehicle controlling apparatus including a responsive vehicle device operable step by step to different controlling positions and adapted to return to normal position when released, a plurality of catches for retaining said member when moved to different controlling positions, and means controlling said catches for disengaging them from said member when different reductions in vehicle speed are made according to the different positions of said member.

24. Vehicle controlling apparatus including a responsive vehicle device operable step by step to produce different conditions, a catch for retaining said device when operated one step, a second catch for retaining said device when operated another step, and means controlled by the motion of the vehicle for releasing the first named and second named catches in succession upon predetermined reductions in speed of the vehicle.

25. Vehicle controlling apparatus including a responsive vehicle device including a member and ratchet means for advancing it step by step one or more times, to move said member to different controlling positions, a plurality of catches for retaining said member in its different positions, and means controlling said catches for disengaging them in succession from said member when corresponding reductions in vehicle speed have been complied with, said member returning to normal position when released.

26. Vehicle controlling apparatus including a responsive vehicle device operable step by step to produce caution and danger conditions in succession, a caution catch for retaining said device in caution position, a danger catch for retaining said device in danger position, a governor operated according to the speed of the vehicle, and means operated by the governor for releasing said caution and danger catches in succession when the vehicle is retarded to a predetermined speed and brought to a stop, respectively.

27. Vehicle controlling apparatus including a conductor along which a vehicle is movable, having insulating points therein, means for bridging said insulating points, a vehicle circuit normally closed by said conductor and opened by said insulating points, when the bridging means are open, a member operable step by step to different controlling positions, electro-magnetic means in said circuit having a ratchet connection with said member for advancing said member one or more steps by the opening and closing of said circuit one or more times, a plurality of catches for retaining said member in its different positions, said member returning to normal position when released, and means controlled by the speed of the vehicle and controlling said catches for disengaging the catches in succession from said member when different conditions of vehicle speed reduction have been complied with, according to the positions of said member.

28. Vehicle controlling apparatus including a ratchet member operable step by step for producing different conditions in succession, a responsive electromagnetic device including a pawl engageable with said ratchet member for advancing it step by step by the intermittent operation of said device, said member being arranged to return to initial position when released, catches for retaining said member when advanced different numbers of steps, and means controlling said catches and for disengaging them from said member under different conditions according to the position of said member.

29. Vehicle controlling apparatus including a ratchet member to be advanced step by step for producing caution and danger conditions in succession, a responsive electromagnetic device operable intermittently and including a pawl engageable with said member to advance it step by step, a caution catch to retain said member in caution position, a danger catch for retaining said member in danger position, a governor controlled by the speed of the vehicle, and means controlled by the governor and operatively connected to said catches for disengaging the caution catch from said member when the speed of the vehicle is retarded a predetermined amount and for disengaging the danger catch from said member when the vehicle is brought to a stop, said member returning to initial position when released to restore normal conditions.

30. Vehicle controlling apparatus including a ratchet member to be advanced step by step for producing different controlling conditions, a responsive device including a pawl engageable with said member to advance it step by step, said member being adapted to return when released, means for retaining said member when advanced until predetermined conditions of vehicle control have been complied with, and means operable with said device for removing said pawl from said member after said member has been moved each step.

31. Vehicle controlling apparatus including a ratchet member to be advanced step by step for producing different vehicle controlling conditions, a responsive electromagnetic device operable intermittently and including a pawl engageable with said member to advance it step by step, means for retaining said member in its different positions when advanced one or more steps until predetermined conditions of vehicle control have been complied with, said member being returnable to normal position when released, and electro-magnetic means for disengaging said pawl from said member after each step of movement of said member.

32. Vehicle controlling apparatus including a ratchet member to be advanced step by step to different vehicle controlling positions, a responsive device operable for advancing said member step by step, a plurality of catches to engage said member and hold it in its different positions, a governor controlled by the speed of the vehicle, said member being adapted to return to normal position when released, and an operative connection between said governor and catches for disengaging the catches in succession from said member when different conditions of speed control have been complied with according to the different positions of said member.

33. Vehicle controlling apparatus including a ratchet member operable step by step to produce caution and danger conditions, a vehicle circuit including an electromagnet, an armature member under the influence of said electromagnet, a pawl operated by said armature member to operate the ratchet member and advance it step by step when said circuit is opened and closed in succession, a caution catch for holding said ratchet member when advanced to caution position, a danger catch for holding said ratchet member when advanced to danger condition, said ratchet member returning to initial position when released, a governor controlled by the motion of the vehicle, and an operative connection between said governor and catches for disengaging the caution catch from said ratchet member when the speed of the vehicle is reduced a predetermined amount and for disengaging the danger catch from said ratchet member when the vehicle is stopped.

34. Vehicle controlling apparatus according to claim 33 and also including an electromagnet in said circuit for normally disengaging said pawl from said ratchet member when said armature member is attracted by the first named electromagnet.

35. Vehicle controlling apparatus including rails having insulating points therein, controlling means for bridging some of said insulating points, a vehicle circuit arranged to be normally closed by said rails and to be opened intermittently when passing said insulating points with said bridging means open, a vehicle device responsive to the opening and closing of said circuit one or more times to produce progressive conditions in succession one after the other, said device being adapted to return to normal position, and means controlled by predetermined vehicle speeds for controlling the return of said device accordingly.

36. Vehicle controlling apparatus including a conductor along which a vehicle is movable, having insulating points therein, means for bridging said insulating points, and a vehicle controlling device including a circuit normally closed by said conductor and opened by said insulating points, when the bridging means are open, said device including electrical means deenergized when said circuit is opened when passing one of said insulating points with its bridging means open, and reenergized when the circuit is again closed after passing such insulating point, and so arranged that such reenergization completes a predetermined condition of vehicle control which is maintained until the corresponding required conditions are complied with.

37. Vehicle controlling apparatus including a conductor along which a vehicle is movable, having insulating points therein, means for bridging said insulating points, and a vehicle controlling device including a circuit normally closed by said conductor and opened by said insulating points, when the bridging means are open, said device having electrically energized means in said circuit to be deenergized and reenergized in passing said insulating points with the bridging means open, and said device includin a progressively operable means advanced step by step by the repeated deenergization and reenergization of said electrically energized means for producing different vehicle controlling conditions in succession.

38. Vehicle controlling apparatus including a conductor along which a vehicle is movable, having insulating points therein, means for bridging said insulating points, a vehicle circuit normally closed by said conductor and opened by said insulating points, when the bridging means are open, electrically energized means in said circuit, a step by step device advanced by the deenergization and reenergization of said means, means controlled by the speed of the vehicle for controlling the return of said device to normal position when the speed of the vehicle has been retarded a predetermined corresponding amount according to the position of said device, and means controlled by said device for producing different vehicle controlling conditions according to the advanced position of said device.

39. Vehicle controlling apparatus including a rail having insulating points therein, controlling means for bridging said isulating points, a train controlling circuit closed by said rail and opened by said insulating points with said bridging means open, and a vehicle device responsive to the opening and closing of said circuit and operable in progressive succession to produce different conditions according to the number of times the circuit is opened and closed.

In testimony whereof I hereunto affix my signature.

ALFRED L. RUTHVEN.